United States Patent [19]

Kuroda et al.

[11] 4,084,372

[45] Apr. 18, 1978

[54] INTERNAL COMBUSTION ENGINE

[76] Inventors: Hiroshi Kuroda, No. 2-40-3, Okusawa, Setagaya-ku, Tokyo; Yasuo Nakajima, No. 1-16, Kubiri, Yokosuka City; Yoshimasa Hayashi, Kuden-danchi 4-201, No. 740, Kuden-cho, Totsuka-ku, Yokohama City; Kunihiko Sugihara, No. 1-9-9, Morigaoka, Isogo-ku, Yokohoma City; Yasuo Takagi, No. 1757-70, Kamigo-cho, Totsuka-ku, Yokohama City, all of Japan

[21] Appl. No.: 696,707

[22] Filed: Jun. 16, 1976

[30] Foreign Application Priority Data

Jun. 24, 1975  Japan ................................. 50-78351

[51] Int. Cl.² .......................... F01N 3/10; F02M 25/06
[52] U.S. Cl. ........................................ 60/278; 60/305; 123/30 C; 123/119 A
[58] Field of Search ............. 60/278, 305; 123/119 A, 123/30 C

[56] References Cited

U.S. PATENT DOCUMENTS

| 1,754,735 | 4/1930 | Barnaby | 123/30 C |
| 2,257,631 | 9/1941 | Wahlberg | 123/41.31 |
| 3,662,541 | 5/1972 | Sawada et al. | 60/305 X |
| 3,875,914 | 4/1975 | Villella | 123/119 A |

FOREIGN PATENT DOCUMENTS 2,345,556  4/1974  Germany ...................... 123/148 DS

*Primary Examiner*—Carlton R. Croyle
*Assistant Examiner*—Michael Koczo, Jr.

[57] ABSTRACT

A combustion arrangement which enables combustion with high EGR comprises an ignition means positioned within an area which is disposed in the neighborhood of a location at which the thickness of the combustion chamber is the maximum and adjacent the cylinder axis.

4 Claims, 3 Drawing Figures

INTERNAL COMBUSTION ENGINE

The present invention relates to an internal combustion engine.

Many attempts have been made to reduce NOx, HC and CO contents of the exhaust gas discharged from an internal combustion engine into the atmosphere. The introduction of a catalytic converter or a thermal reactor in the exhaust system is considered to be effective in reducing HC and CO contents of the exhaust gas, however this is not effective in reducing NOx contents of the exhaust gas. Although a catalyst for the reduction of NOx is available, it has a short life and thus requires frequent interchange. The introduction of exhaust gas recirculation (EGR) is considered to be effective in reducing NOx content of the exhaust gas. Increasing the EGR rate up to the driveability limit of the engine will result in a maximum reduction in NOx contents of the exhaust gas. However, with the conventional single spark ignition internal combustion engine the maximum EGR rate is approximately 10 percent EGR and the reduction in NOx of the exhaust gas is not enough.

The present invention aims at modifying a single spark ignition internal combustion engine to provide a combustion arrangement whereby combustion with high EGR is possible.

It is therefore a primary object of the present invention to provide an internal combustion engine which makes possible combustion with high EGR.

It is another object of the present invention to provide an internal combustion engine which will maintain the exhaust gas at elevated temperature to help oxidation of HC and CO contents of the exhaust gas.

It is still another object of the present invention to provide an internal combustion engine which operates with low NOx, HC and CO emissions.

The other objects and advantages of the present invention will become apparent from the following description in connection with the accompanying drawings, in which.

Figure 1:
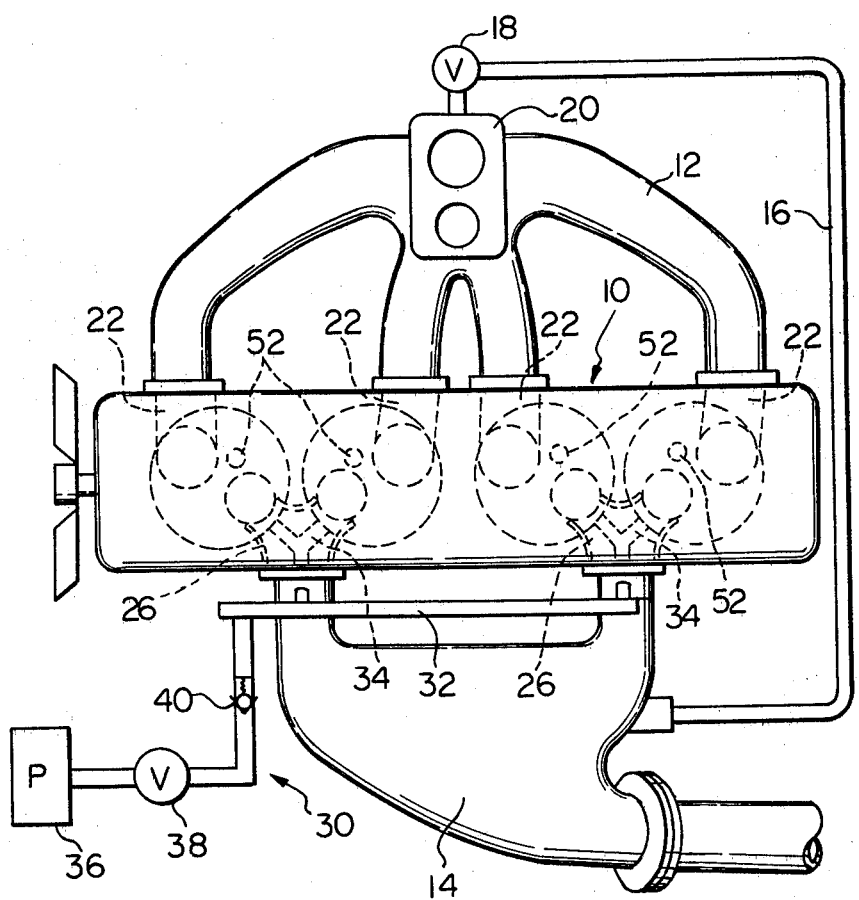
FIG. 1 is a schematic diagram of a preferred embodiment of an internal combustion engine according to the present invention.

Referring to FIG. 1, reference numeral 10 designates an engine block having four cylinders, reference numeral 12 an intake manifold, reference numeral 14 an exhaust means, such as a thermal reactor or a catalytic converter, reference numeral 16 an exhaust gas recirculation (EGR) conduit, and reference numeral 18 an exhaust gas recirculation (EGR) control valve which controls the flow rate of the exhaust gas through the EGR conduit 16.

The intake manifold 12, which distributes a combustible mixture from a carburetor 20 to the cylinders, splits into four branches to meet four intake ports 22, respectively, which lead to respective cylinders through a cylinder head 24. Each pair of cylinders has a Siamese exhaust port 26. Each of the exhaust ports 26 is provided with a port liner 28 (see FIG. 2).

When it is necessary to add air into the exhaust gas for the oxidation of HC and CO contents of the exhaust gas, the air is injected into the exhaust ports 26 by a secondary air supply system 30. The system 30 has an air gallery 32 from which air injection nozzles 34 extend into the exhaust ports 26, respectively, an air pump 36, a pressure control valve 38, and a check valve 40 between the pressure control valve 38 and the air gallery 32.

Figure 2:
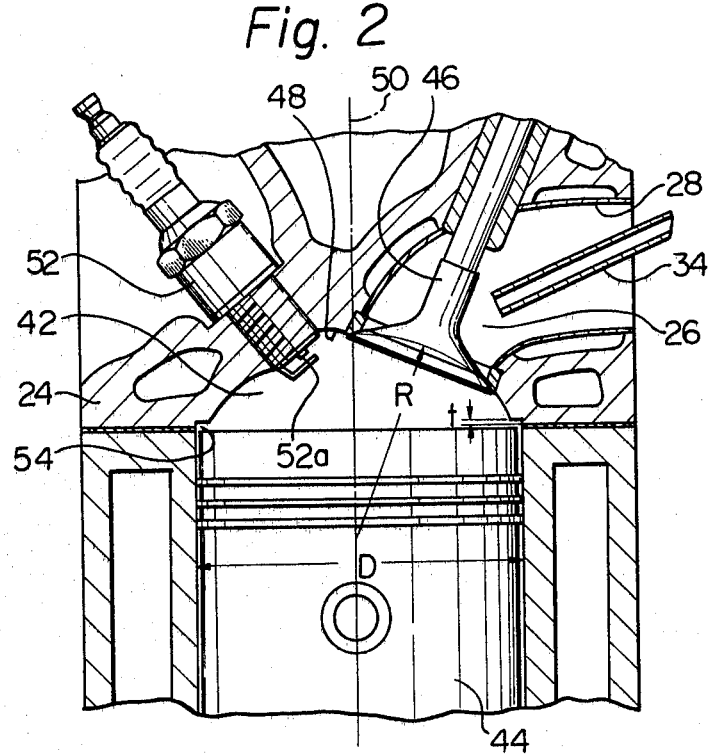
FIG. 2 is a fragmentary section of one of the cylinders shown in FIG. 1.

Referring to FIG. 2, a combustion chamber 42 is defined by the cylinder, cylinder head 24 and a reciprocating piston 44 in the cylinder. The section in FIG. 2 is such that the exhaust port 26 and its associated exhaust valve 46 are shown. The cylinder head 24 is formed with a generally spherical recess 48 having the center of its basic sphere disposed on the cylinder axis 50. A spark plug 52 is mounted to the cylinder head 24 so that its electrode 52a is positioned within an area which is disposed in the neighborhood of a location at which the thickness of the combustion chamber 42 is the maximum and adjacent the cylinder axis 50. Positioning the electrode 52a within the area and adjacent the cylinder axis 50 shortens the flame travel, thus enabling rapid completion of combustion with high EGR. This makes possible the combustion with 12–25 percent EGR.

Should the ignition with a spark be initiated at the center of a spherical combustion chamber, the flame travel would be the shortest. However it is almost impossible from the production standpoint to make a spherical combustion chamber. Thus the combustion arrangement just discussed is practical.

Figure 3:
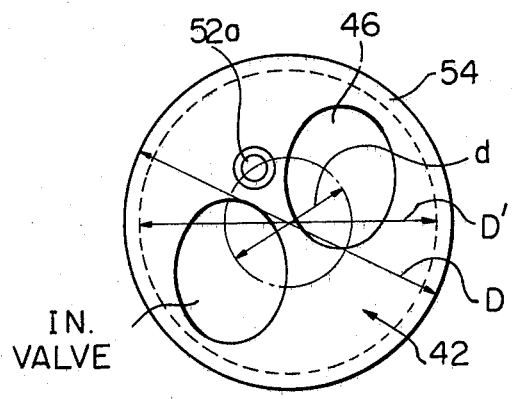
FIG. 3 is a plane view of the cylinder shown in FIG. 2.

It was confirmed by various tests conducted by the inventors of this application that stable combustion with 25 percent EGR was possible with a combustion arrangement as follows:

The shape of a combustion chamber is a half spherical type which satisfies the following dimensional relations (see FIGS. 2 and 3);

$$R = (0.65 \pm 0.1) \times D$$

$$D' = (0.9 \pm 0.05) \times D$$

$$t = 3 \pm 1.5 \text{ (mm)}$$

where,
- R is the radius of the basic sphere of a spherical portion of the combustion chamber;
- D' is the diameter of a non-squish area with a squish area therearound;
- t is the thickness of the squish area; and
- D is the diameter of a bore of the cylinder and ranges from 70–90mm;

and the electrode 52a of the spark plug 52 is disposed within a circular area or region around the cylinder axis 50. It is the most preferable that the electrode 52a be disposed at the cylinder axis 50, but it is impractical to dispose the electrode at the cylinder axis because of the interference with intake and exhaust valves or because of the engine construction.

Taking into consideration that the larger the volume of the squish area is, the greater turbulence in the combustion chamber during the compression stroke of the piston is, thus increasing the propagation speed of the flame, but increasing HC and emission, the squish area, now indicated by 54 (see FIGS. 2 and 3), shall be designed such that a suitable strength of turbulence is created in the combustion chamber 42 with little increases in HC and CO contents of the exhaust gas.

The combustion arrangement described in the preceding has an advantage that the use of the electrode of a spark positioned within an area which is disposed in the neighborhood of a location at which the thickness of a combustion chamber and adjacent the cylinder axis results in rapid completion of the combustion and thus enables the combustion with high EGR without deteriorating the driveability, resulting in a great reduction in NOx contents of the exhaust gas. It is also to be noted that the use of turbulence caused by the squish area contributes to rapid completion of the combustion.

It will also be understood that the use of Siamese exhaust ports and of secondary air injection result in efficient oxidation of HC and CO contents of the exhaust gas within exhaust converter following the exhaust ports. As a result, HC and CO contents of the exhaust gas are greatly reduced.

Preferably, a spark plug is mounted to a cylinder head so that its electrode is directed toward the center of a combustion chamber so a to shorten the propagation of flame in the longitudinal direction of the combustion chamber.

Any shape is used as a combustion chamber as long as it has a relatively small surface to volume (S/F) ratio. Thus use of small S/F ratio results in reductions in HC and CO formations during the combustion. This also results in shortening of the combustion time because the propagation of the flame is not hampered.

As best understood from FIGS. 1 and 3, the intake and exhaust manifolds 12 and 14 are disposed on the laterally opposite sides of the cylinder head 24 and each of the intake valve ports is offset from a transverse plane passing, as vertical to a longitudinal axis of the cylinder head, through the cylinder axis, in one direction along the longitudinal axis of the cylinder head 24. This arrangement has made it possible to mount a spark plug 52 with its electrode 52a disposed nearer to a lateral side, to which the intake manifold 12 is connected, then the cylinder axis is. It has been recognized that a more rapid combustion occurs when an electrode of a spark plug is disposed nearer to the intake manifold 12 than the case when an electrode is disposed nearer to the exahust manifold 14. With the combustion arrangement as illustrated in FIGS. 1 to 3, stable combustion with an EGR rate up to 25 percent EGR is possible without any appreciable loss in fuel economy and power output.

What is claimed is:

1. In an engine system:
a cylinder block having a plurality of cylinders;
a cylinder head closing said plurality of cylinders, said cylinder head having a plurality of recesses corresponding in number to said plurality of cylinders, said recesses arranged to close said plurality of cylinders, respectively, each of said plurality of recesses having a spherical surface with its center of radius of curvature disposed on the cylinder axis of the corresponding one of said plurality of cylinders,
said cylinder head having a first lateral side and a second lateral side opposite to said first lateral side, having a plurality of intake port bores, each extending from an inlet port within said first lateral side inwardly toward an intake valve port of adjacent one of said cylinders, and having a plurality of exhaust port bores, each extending from an outlet port within said second lateral side inwardly toward at least one of exhaust valve ports of said plurality of cylinders;
a plurality of pistons reciprocally disposed in said plurality of cylinders, respectively, each of said plurality of pistons having a top surface having a non-squish area coextending with the shadow of said spherical surface of the corresponding one of said plurality of recesses which is projected along the cylinder axis, each of said top surfaces having a squish area around and outside of the non-squish area thereof;
an intake manifold disposed on one side of said cylinder head and connected to said inlet ports within said first lateral side of said cylinder head;
an exhaust manifold disposed on the opposite side of said cylinder head and connected to said outlet ports within said second lateral side of said cylinder head;
each of said intake valve ports being offset from a transverse plane passing through the cylinder axis of the corresponding one of said plurality of cylinders in a direction along a longitudinal axis of said cylinder head, said transverse planes being perpendicular to said longitudinal axis of said cylinder head, and said intake valve ports being offset from the cylinder axis of the corresponding one of said plurality of cylinders toward said first lateral side of said cylinder head;
means for introducing a portion of exhaust gases within said exhaust manifold into said plurality of cylinders through their respective intake valve ports;
ignition means for causing combustion within said plurality of cylinders, said ignition means comprising a plurality of spark plugs arranged adjacent said plurality of cylinders, each of said plurality of spark plugs having its electrode disposed within an area which is in the neighborhood of a location where thickness of a combustion chamber, as measured from a point on the spherical surface of the recess to the top surface of the corresponding piston along the cylinder axis, is maximum and which is disposed nearer to said first lateral side than said cylinder axis.

2. An engine system as claimed in claim 1, in which a secondary air supply system is provided to inject air into said plurality of exhaust port bores.

3. An engine system as claimed in claim 2, in which said cylinder head has a plurality of port liners mounted within said plurality of exhaust port bores, respectively, to define an exhaust gas flow passage.

4. An engine system as claimed in claim 3, in which each of said plurality of exhaust port bores extend toward adjacent two exhaust valve ports.

* * * * *